United States Patent [19]

Reeve

[11] 4,047,845
[45] Sept. 13, 1977

[54] CYCLIC PUMP
[75] Inventor: Paul H. Reeve, River Vale, N.J.
[73] Assignee: Auto Research Corporation, Rochelle Park, N.J.
[21] Appl. No.: 643,376
[22] Filed: Dec. 22, 1975
[51] Int. Cl.² .......................... F04B 3/00; F04B 5/00
[52] U.S. Cl. ................................. 417/251; 417/258
[58] Field of Search ............... 417/251, 258, 460, 471
[56] References Cited
U.S. PATENT DOCUMENTS

| 1,051,888 | 2/1913 | Hochgesand | 417/258 |
| 1,169,707 | 1/1916 | Williams | 417/258 |
| 1,742,746 | 1/1930 | Zubaty | 417/471 |
| 2,357,870 | 9/1944 | Beeh | 417/251 |
| 2,603,158 | 7/1952 | Nemetz | 417/258 |
| 2,981,198 | 4/1961 | Nettel | 417/460 |

FOREIGN PATENT DOCUMENTS

| 1,119,453 | 12/1961 | Germany | 417/251 |

Primary Examiner—Carlton R. Croyle
Assistant Examiner—Gregory P. LaPointe
Attorney, Agent, or Firm—Ostrolenk, Faber, Gerb & Soffen

[57] ABSTRACT

The output from the pump chamber of a higher volume piston pump is divided between a return bypass and the pump chamber of a smaller volume piston pump; the piston of the high volume piston pump is periodically raised by a cam to draw fluid into the pump chamber; when this piston is released, a spring forces fluid from the high volume pump chamber; the pump chamber of the small volume pump is connected with the cam such that the volume of the low volume pump chamber decreases, thereby pumping out the fluid in that chamber, when the large volume pump chamber is taking in fluid, and vice versa; appropriate valves ensure that flow is only in the desired direction; adjustment and calibration means are provided for the low volume pump.

19 Claims, 8 Drawing Figures

CYCLIC PUMP

BACKGROUND OF THE INVENTION

The present invention is directed toward fluid pumps in general and more particularly to cyclically operated fluid pumps, to low volume cyclic pumps and to such pumps for use in pumping liquid lubricant. Hereafter, the pumping of liquid lubricant or oil will be discussed. However, the invention is adaptable for use with other liquids and fluids.

In automatic, cyclically operated sometimes motorized oil pumps, precisely controlling the delivered volume of small quantities of oil is difficult. Various low volume pumps are available. But, the range in volume that may be produced by such pumps is often limited by the strength of the motor and/or the capacity of the pump chamber. It is desirable to have an accurately calibratable oil pump capable of pumping in the range of a very small volume to a relatively quite large volume with minimum adjustment steps and maximum accuracy.

SUMMARY OF THE INVENTION

Most broadly, the pump of the invention includes a first cyclically operated piston pump of larger oil volume capacity, the output of which is in part bypassed and in part directed to a second cyclically operated piston pump of smaller oil volume capacity, and the second pump delivers oil to the points and bearings being serviced. The same operating means is mechanically connected to the first piston pump and to the second piston pump and mechanically operates the two pumps together. The connection between the operating means and the first and second piston pump is such that as the pump chamber of the first piston pump is being filled, the pump chamber of the second piston pump is being exhausted, and vice versa. Appropriately placed check valves ensure that oil flows only in the desired direction.

The piston of the first pump is mechanically connected with a motorized cam, which withdraws the pump piston from the pump chamber and this fills the first pump chamber with oil. A spring connected with the first pump piston acts in opposition to the cam. When the first pump piston is released from the cam, the spring forces that first pump piston into the pump chamber to pump oil therefrom.

It is the cylinder of the second pump that is mechanically connected to the motorized cam. The second pump piston is stationary relative to the motion of its cylinder. Hence, the second pump acts 180° out of phase with the first pump.

Pumping from the first pump is under the influence of a spring, while filling of the first pump chamber is under the positive control of a cam. In contrast, it is the pumping from the second pump chamber that is under the positive cam control, while the filling of the second pump chamber is principally caused by the pumped output from the first pump chamber.

Means are provided for adjusting the stroke of the first pump piston and for adjusting the stroke of the second pump piston. This is to control the volume of lubricant pumped by each pump. A preferred technique for adjusting the strokes of these pistons is to select the portion of the travel path of the drive cam during which that cam is in engagement with cam followers associated with the cam controlled elements. A cam controlled element which is in engagement with the cam for a smaller portion of the travel path of the cam moves a smaller distance and thereby pumps a smaller volume.

Accordingly, it is the primary object of the present invention to effectively pump a relatively small quantity of fluid automatically and cyclically.

It is another object of the invention to be able readily to adjust the quantity of fluid to be pumped.

It is another object of the invention to be able to adjust the quantity of fluid to be pumped over a broad volumetric range.

These and other objects of the invention and the foregoing general description of the pump of the invention will be better understood from the following description of the accompanying drawings.

BRIEF DESCRIPTION OF THE DRAWINGS

FIG. 8 is a cross-sectional elevational view into one element of the pump.

DETAILED DESCRIPTION OF A PREFERRED EMBODIMENT

Figure 1:
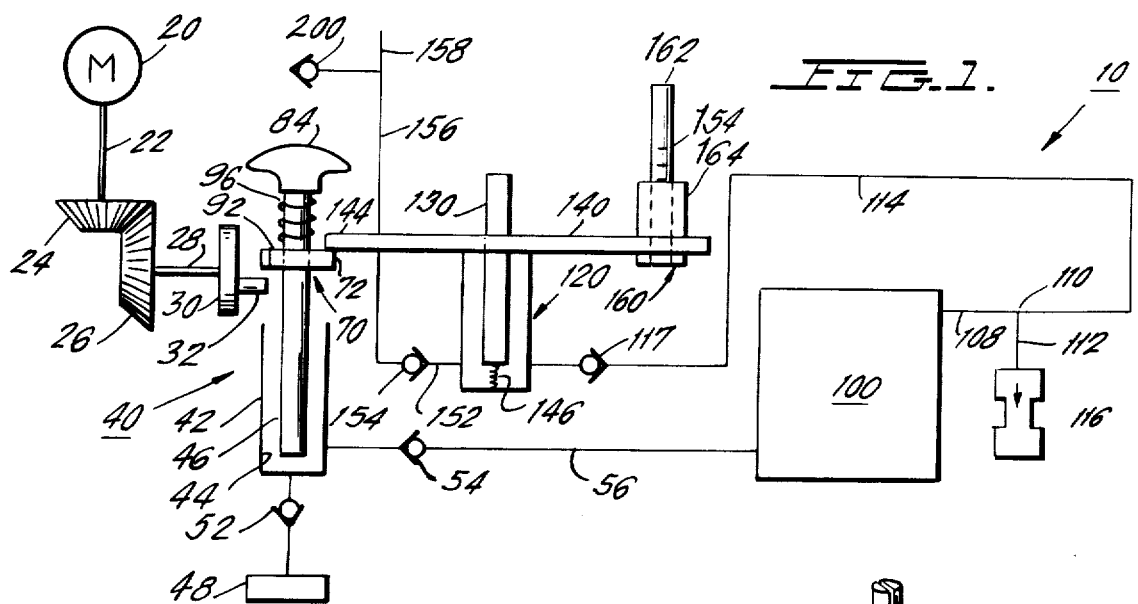
FIG. 1 is a schematic drawing of the major components of the pump of the invention.

The oil or lubricant or fluid pump 10 of the present invention includes a support bracket or plate 12 on which and from which all of the other elements of the pump 10 are supported. An oil reservoir 14 is supported by and located beneath bracket 12. Filler cap 16 over plate 12 and oil filter 18 beneath cap 16 provide an entrance for oil to fill the reservoir 14.

A conventional, relatively low power electric motor 20 is attached atop plate 12. The motor drive shaft 22 passes through the plate 12 and carries and drives the bevel gear 24. Bevel gear 24 mates with cooperating bevel gear 26 having an axle 28 that is supported in fixed position from the support plate 12. The diameters of the gears 24, 26 are related so as to step down the speed of rotation of gear 26 to the desired cycle time for the pump 10 and to increase the torque on gear 26.

Also carried on axle 28 and spaced from bevel gear 26 is the wheel 30 from one surface of which projects the pin cam 32 located eccentrically to axle 28. Pin cam 32 serves as the drive means for the first and second below described piston pumps 40, 120.

The structure of first piston pump 40 shares many features of known pumps. Pump 40 includes the pump cylinder 42. Cylinder 42 extends down from a longer housing 43 that extends through and is affixed to support plate 12. Cylinder 42 defines within it the first pump chamber 44. The piston 46 sealingly passes through cylinder 42 and closes chamber 44. Piston 46 is movable, by means described above, for alternately raising the piston and drawing oil into chamber 44 as the chamber enlarges and lowering the piston and pumping oil from the chamber as it reduces in size. The inlet to chamber 44 is through suction filter 48 comprised of felt, fabric or any other appropriate porous filtering medium. The oil is sucked through a filter 48 and through the one way check valve 52 into chamber 44. Check valve 52 prevents oil from being returned out of chamber 44 through filter 48. Outlet from chamber 44 is through one way check valve 54, through connecting tube 56 to the remainder of the system, as described below.

Above cylinder 52, housing 43 is cut out at its upper section 62. This defines guide surfaces 64 for below described platform cam follower 72. Piston 46 is integral with its continuing support portion 66, and the latter passes through housing section 62 and plate 12 and terminates in the upper end portion 68. Portion 68 is threaded about its peripheral exterior and this is used for controlling the height of the platform cam follower 72.

The platform cam follower assembly 70 is comprised of the platform cam follower 72 which has an opening 74 therethrough, through which passes the platform cam follower support sleeve 76. Cam follower 72 is press fit or otherwise fixedly secured onto sleeve 76. The sleeve 76 has an internal diameter substantially conforming to the external diameter of piston support portion 66. Sleeve 76 passes up through plate 12. At its upper portion 78, sleeve 76 is internally threaded matingly to the external thread on portion 68 of the piston support portion 66. Axial rotation of piston 46 along with its support portion 66, 68 causes the platform cam follower assembly 70 to rise or descend in FIGS. 2 and 7 which, as shown further below, determines the length of the stroke of piston 46 and the volume of oil pumped from chamber 44. The interconnection between platform cam follower 72 and piston support portion 66 at the screw connection at 68, 78, causes piston 46 to move together with the platform cam follower 72 under the influence of the pin cam 32.

Platform cam assembly sleeve 76 projects well above plate 12 and has an externally threaded upper portion 82 which receives the handle 84 for manually operating piston 46.

Figure 5:
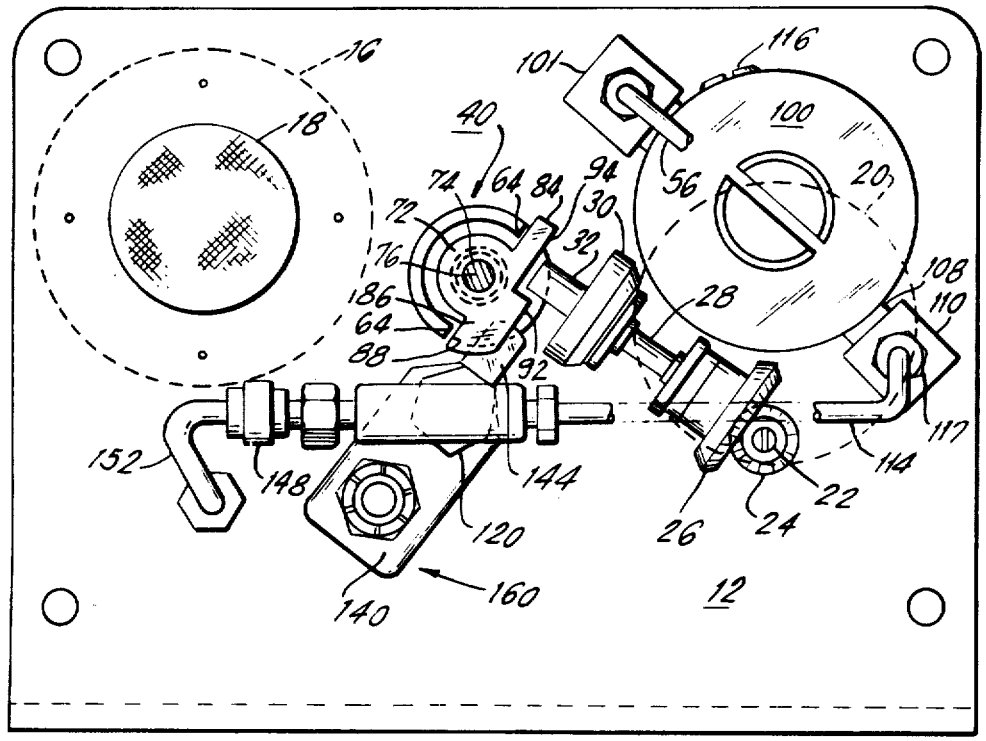
FIG. 5 is a bottom view of the pump in the direction of arrows 5 in FIG. 3.

As shown in FIG. 5, the platform cam follower 72 has two oppositely projecting arms 84, 86. The rear surfaces 88 of arms 84, 86 rubbingly engage the pump housing surfaces 64, and this maintains the cam follower 72 at a continuous orientation, despite rotation of pump piston 46 with respect to the sleeve 76. Platform cam follower 72 has a forward platform 92 projecting forward of its arm 86. Platform 92 projects forwardly of the cam follower sufficiently to be engaged by the pin cam 32. The front side 94 of arm 84 does not project forwardly as far as the projecting platform 92 and the pin cam 32 freely passes the front surface 94 of arm 84.

Figure 7:
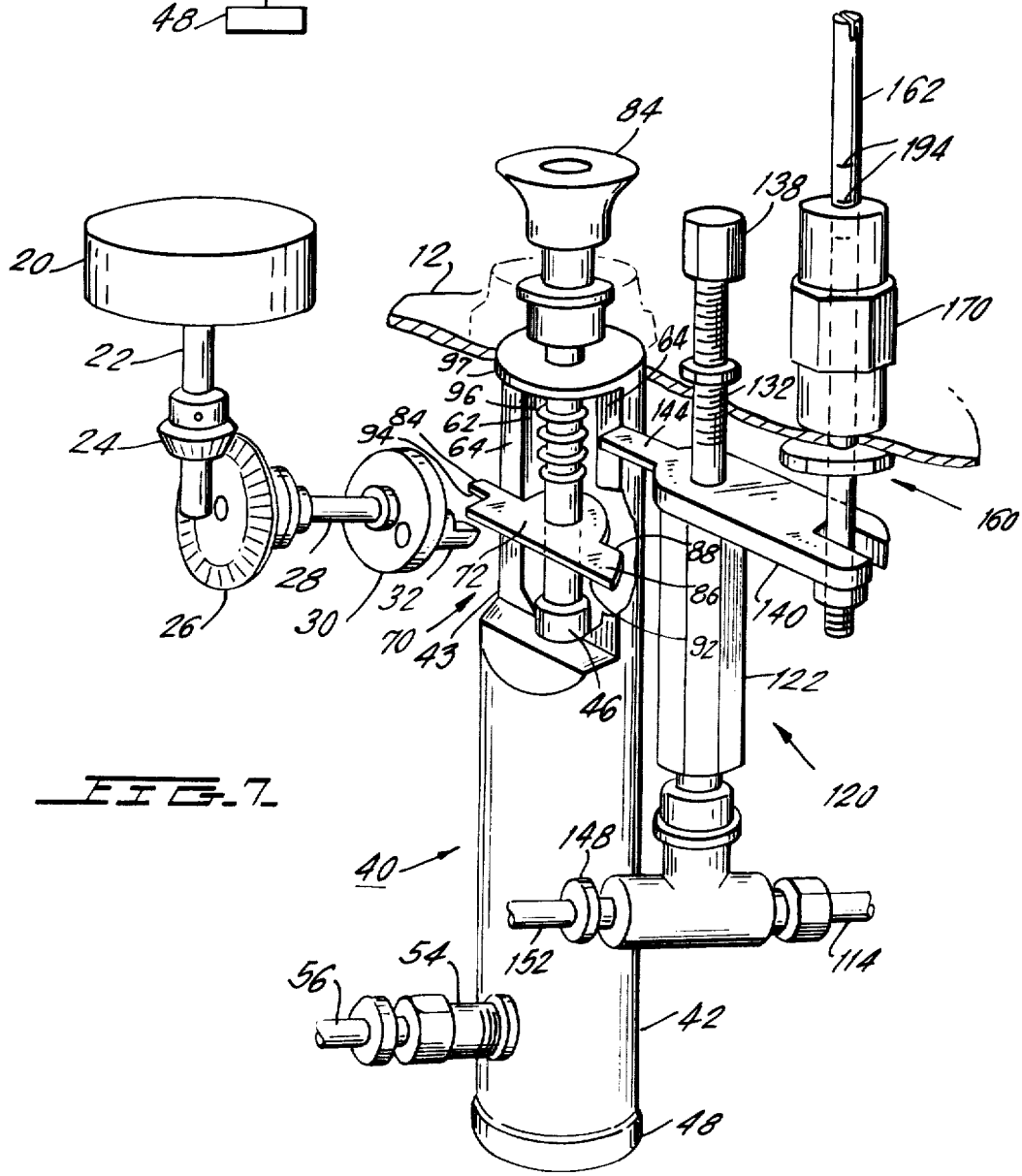
FIG. 7 is a perspective view of major elements of the pump.

In FIGS. 1, 5 and 7, the cooperation among wheel 30, pin cam 32 and platform cam follower 72 is illustrated. The height of cam follower 72 with respect to wheel 30 and its axle 28 is preselected so that for part of the rotational movement of pin cam 32, it is in engagement with cam follower platform 92. The cam follower 72 and the pump piston 46 are raised by the pin cam 32. Hence, the starting height of the cam follower 72 before it is engaged by cam 32 determines the total elevation of the piston 46 by the pin cam 32 above its initial starting point. When the pin cam 32 is rotated by wheel 30 to a point where it passes out from platform 92 and is before surface 94, the cam follower 72 and the attached piston 46 are no longer held up by the pin cam 32.

A compression spring 96 presses at one end against the pump flange 97 of housing 43 and at the other end against the platform cam follower 72 and thereby biases the piston 46 downwardly to reduce the volume of chamber 44 and thereby pump oil therefrom. In a typical installation, the spring 96 exerts a pressure of approximately 75 psi. The flow resistances in the system are selected so that under the influence of spring 96, the pump chamber 44 empties relatively rapidly.

It is apparent that the cycle of operation of first pump 40 is determined by the cycle of operation of pin cam 32. Between operating cycles of pin cam 32, if it is desired to apply a charge of oil to the system, the handle 84 is pulled upwardly, which effectively imitates the action of cam follower 72, and chamber 44 is filled. Release of handle 84 enables spring 96 to pump the oil out of chamber 44.

For stabilizing the entire pump 40 on plate 12, the housing 43 projects through the plate 12 and has an upper portion 98, which is externally screw threaded to cooperate with support and sealing nut 99 which is internally screw threaded and tightened over the upper portion 98 of housing 43. Nut 99 presses against the plate 12 and rigidifies and supports the housing 43.

From above described tube 56, oil enters through fitting 101 into pressure filter 100. Flow through filter 100 is from chamber 102 through porous, sintered metal filter element 104, into outlet chamber 106 and from there through outlet conduit 108 and through junction 110.

Junction 110 divides the flow from conduit 108 between the bypass conduit 112 and the second pump inlet conduit 114. At the end of conduit 112 is a conventional, continuously open fitting 116 with a flow rate restriction, such as a narrowed bore or a narrowed bore spiral pathway, or the like. The restriction in fitting 116 is selected such that the major portion of the flow from conduit 108 exits through the bypass fitting 116. The minor portion of the flow continues through the conduit 114 to the second pump 120. The restriction in fitting 116 is coordinated with the capacities of first pump 40 and second pump 120. The purpose of the bypass 116 is to ensure the filling of the below described second pump chamber 126. The resistance of the fitting 116 must be sufficient that the second pump chamber 126 fills completely upon each downstroke of first pump piston 46. However, the resistance of the bypass fitting 116 must also not be so great that it prevents complete spring 96 caused discharge of the contents of first pump chamber 44 before the start of the next cycle of motion of piston 46.

There is a one-way check valve 117 in conduit 114 for ensuring that there will be no return flow from second pump 120 during its pumping stroke. Second pump 120 includes pump cylinder 122 which is screw threadedly attached to the entrance fitting 124 which closes the bottom of the pump cylinder 122. The pump piston 130 is sealingly carried in the cylinder 122 and the lower surface of the piston 130 closes off and defines the pump chamber 126. The piston 130 is part of an elongated shaft 132 which projects through an opening in plate 12. A nut 134 is tightened over shaft 132 and seats on plate 12. The position of the nut 134 along shaft 132 determines the length of piston 130. Once adjusted in length, piston 130 remains stationary, and nut 134 holds it stationary. Piston 130 has a small air bleed conduit 136 passing through to its top end and this conduit is closed by the check valve 137 and by closure cap 138. Usually, there is no air chamber 126. However, at least during the initial manufacture of the pump 10 and after shipping or at other unusual times during operation of the pump, there will be a build up of air in chamber 126 which is bled off through usually sealed conduit 136.

To effect pumping in pump 120, it is the cylinder 122, 124 that is shifted. At its upper end, the cylinder 122 seats against the cam follower, platform 140. As cam follower platform 140 shifts up and down, cylinder 122 correspondingly shifts. Securement between the cylinder 122 and the platform 140 is by soldering, welding or other securement technique.

Platform 140 is intended to be driven by the same pin cam 32 that drives the pin cam follower 72. There is a direct mechanical connection, therefore, between platform 140 and pin cam 32. As shown in the drawings, this connection comprises the end portion 144 of platform 140 resting on the top surface of the arm 86 of cam follower 72. Hence, pin cam 32 engags platform 140 through cam follower 72. Within the contemplation of this arrangement, platform 140 might be beneath cam follower 72, such that it is the former, rather than the latter, that is engaged by the cam 32. But, usually adjustments in the length of stroke of cylinder 122 require that platform 140 be on top, just beneath cam follower 72.

Figure 2:
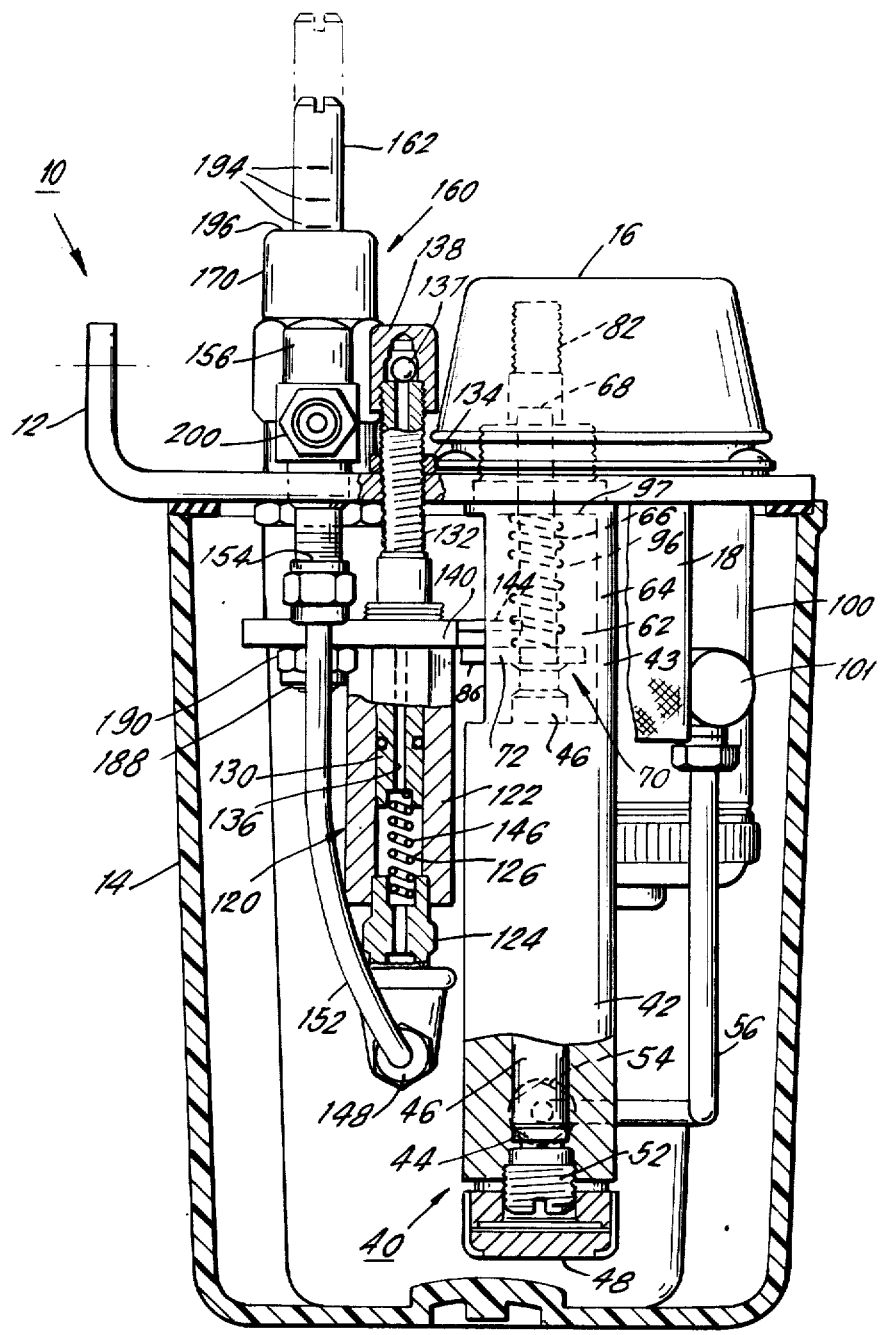
FIG. 2 is a side elevational view into a pump according to the invention.
Figure 3:
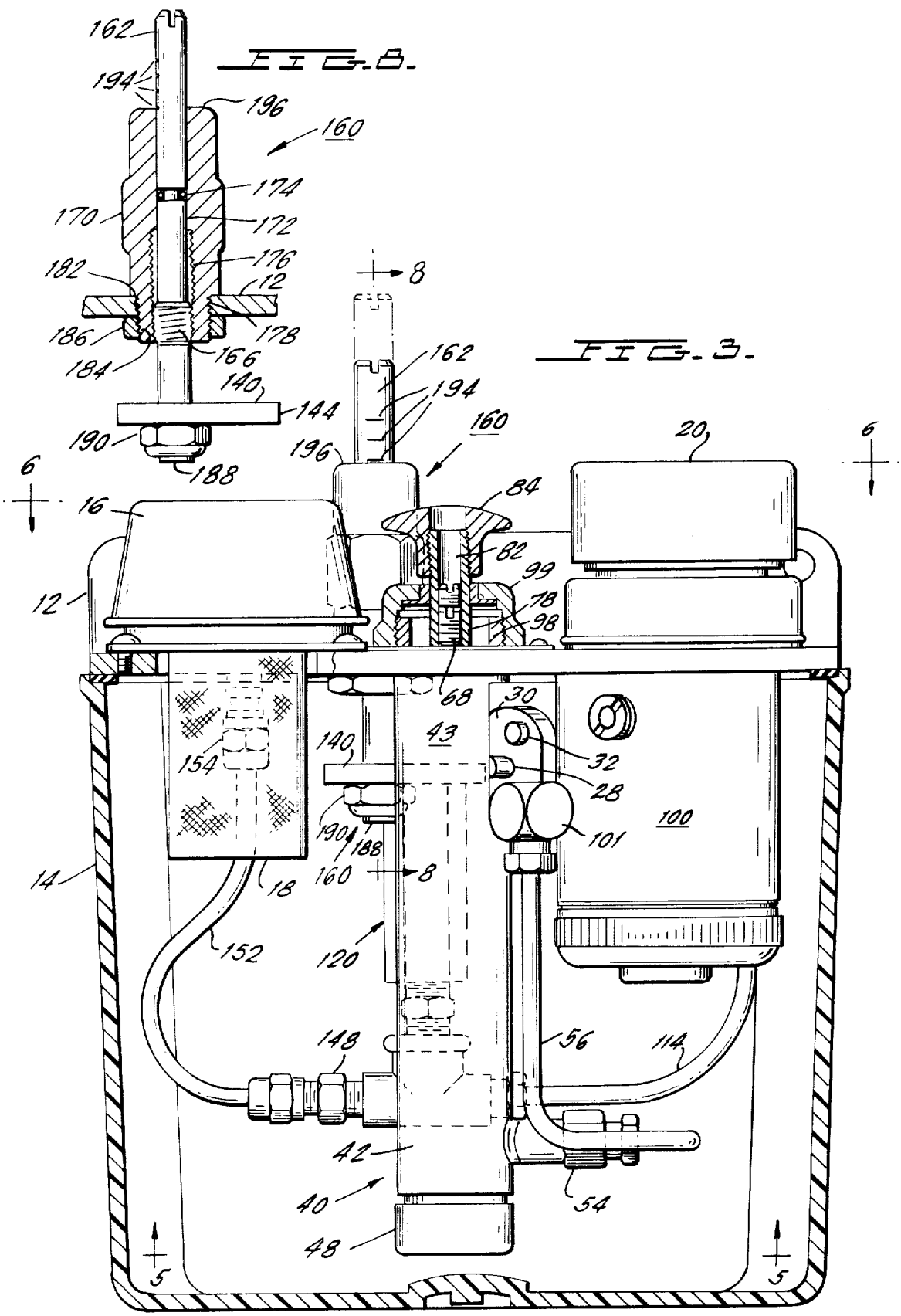
FIG. 3 is a front elevational view into the pump.
Figure 4:
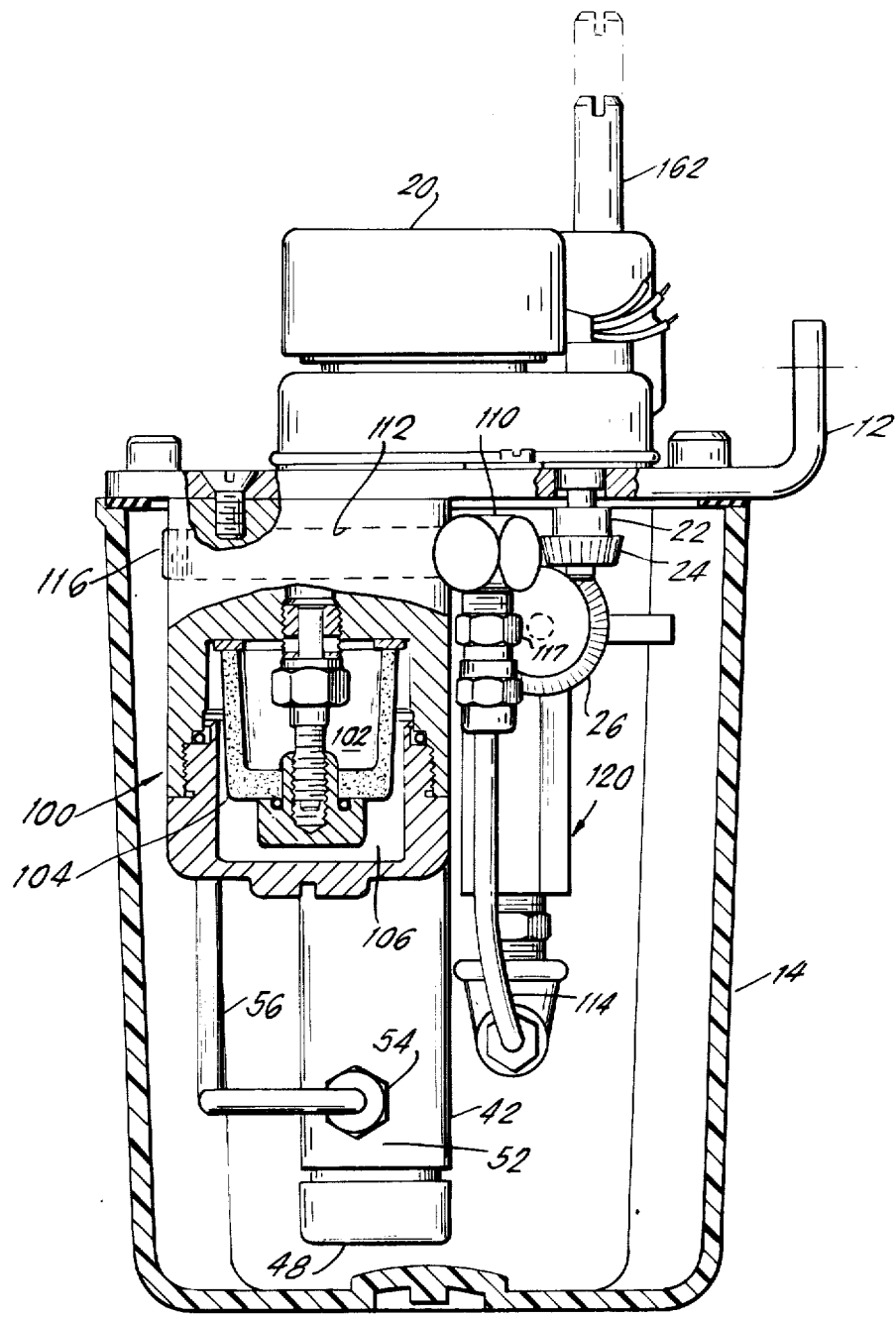
FIG. 4 is the opposite side elevational view of the pump.
Figure 6:
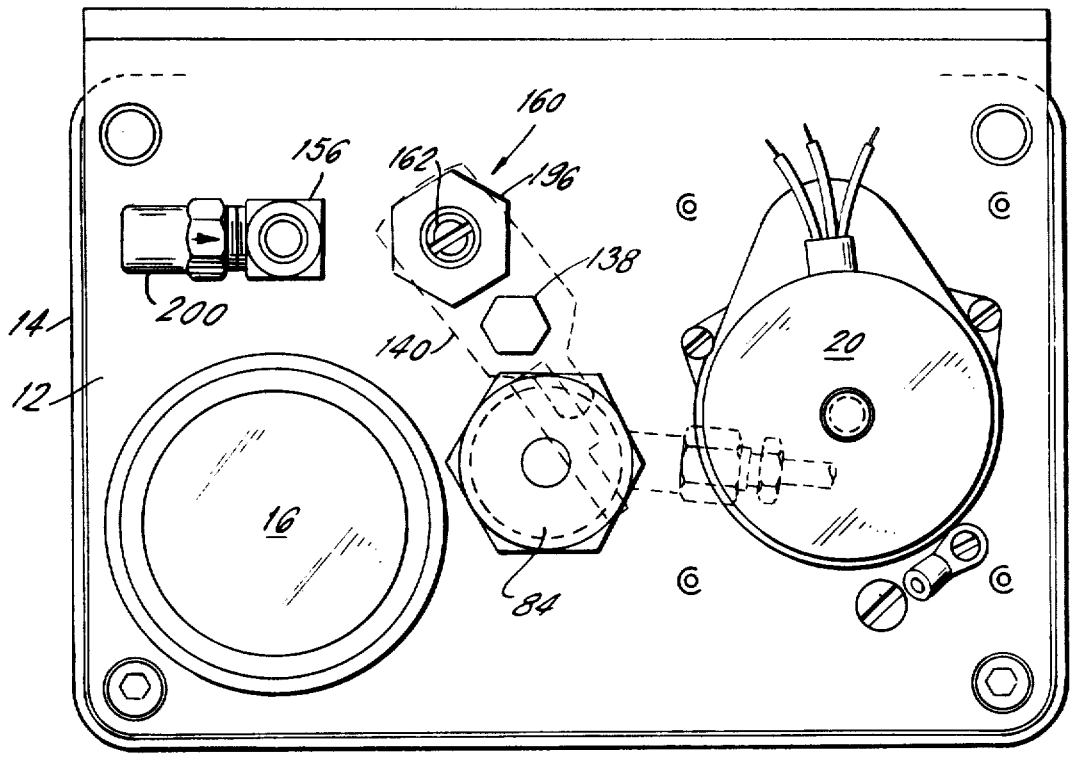
FIG. 6 is a top plan view of the pump in the direction of arrows 6 in FIG. 3.

The spring 146, which extends between a receiving well in end fitting 124 and a receiving well in the end of piston 130, biases fitting 124 and cylinder 122 downwardly in FIG. 2. Because the piston 130 is held stationary, spring 146 draws cylinder 122 and platform 140 securely down against cam follower 72. The purpose of spring 146 is only to hold the aforesaid engagement. Hence, the force of spring 146 is rather weak, and it will have no appreciable effect upon the pumping by the piston 130 in cylinder 122. As a result of the communication from pin cam 32 to platform cam follower 72 to cam follower platform 140, when pin cam 32 raises cam follower 72, which draws oil into the pump chamber 44, this also raises the platform 140 and reduces the volume of chamber 126 which pumps oil from the chamber 126 and through the outlet fitting 148 into the outlet tube or conduit 152.

Conduit 152 is closed off by a high pressure, one way check valve 154 with an opening pressure greater than the spring caused pumping pressure of piston 46. For example, with piston 46 having a spring caused pumping pressure of 75 psi., check valve 154 has a threshold, opening pressure of 100 psi. This ensures that upon the pumping stroke of piston 46, the flow from first pump 40 is into pump chamber 126 and through bypass control fitting 116 and ensures that none of the first pump output completely passes through the passage 126 and out the outlet conduit 152. The pumping stroke of the second pump piston 130 with respect to cylinder 122 is not spring caused but is instead caused by the direct mechanical force exerted by the pin cam 32 on the platform 140. Hence the second pump 120 easily pumps at a pressure in excess of the threshold pressure required to open valve 154. Once it has passed valve 154, the lubricant flow is through outlet 156 and through outlet line 158 which leads to at least one and more usually a plurality of bearings, fittings, or the like, to be lubricated.

Means 160 (FIG. 8) is provided for establishing the quantity of oil to be pumped from the pump chamber 126 of the second pump 120 and for calibrating an indicator which indicates the quantity of oil pumped from chamber 126. A shaft 162 extends from considerably above plate 12, to and through platform 140. Shaft 162 terminates at its lower end in a threaded portion. Intermediate its length, and at the location where shaft 162 passes through the plate 12, the exterior of shaft 162 is threaded at 166, for securing the shaft in the proper position with respect to plate 12.

A shaft securement sleeve 170 is provided. It has a bore 172 though it, through which the shaft 162 sealingly passes. The seal of the shaft 162 is enhanced by the O-ring seal 174. The lower end of bore 172 is threaded internally at 176 with a thread that matingly engages the threaded area 166 on shaft 162. Sleeve 170 passes through an opening 178 provided for it in plate 12. An annular shelf 182 formed on the external periphery of sleeve 170 seats against the upper surface of plate 12 for holding sleeve 170 in position. The exterior of the portion 184 of sleeve 170 that is beneath plate 12 is threaded and receives the locking nut 186 which is tightened up on sleeve 170 beneath plate 12 and holds sleeve 170 against undesired rotation and removal. Axial rotation of shaft 162 moves it up and down due to the cooperation of the threaded surfaces 166, 176.

The threaded lower portion 188 of shaft 162 receives the self locking internally threaded support nut 190 which provides support from beneath for cam follower platform 140. Nut 190 determines the lowest level to which the platform 140 may move in FIG. 2 while it remains in engagement with arm 86 of cam follower 72. Once the platform 140 rests against the nut 190, it will not descend further despite further descent of cam follower 72.

For calibration purposes, the upper end of shaft 162 carries calibration indicator rings 194, each of which carries an indicator or signifies a particular quantity of lubricant that is to be pumped from the pump chamber 126. The upper end 196 of sleeve 170 serves as an indicator to be aligned with the appropriate calibration mark 194.

Adjusting the quantity of lubricant to be pumped from pump chamber 126 and calibrating the indicator to this quantity comprises performing the following steps. With the first pump follower 72 at the height setting for a particular pumping stroke for first pump 40, the first pump piston 46 is moved all the way down through its chamber 44 which moves the cam follower 72 to its bottom position. The shaft 162 is now adjusted in height by rotation thereof so that the top side 196 of the sleeve 170 is at the bottom or minimum volume mark 194 on the shaft 162. It is understood that because the pump chamber 126 has a particular cross-sectional area, for all positions of piston 130 in cylinder 122, a particular volume of oil will be pumped from chamber 126. The plaform 140 is now spaced along shaft 54 by means of a gauge (not shown) so that the space between the sections 144 and 86 of the platform 140 and cam follower 72, respectively, is equivalent to the oil volume indicated on the minimum calibration marking 194. With the plaform 140 held at that location, the nut 190 is tightened up along the threaded portion 188 of shaft 162 until nut 190 engages the bottom of platform 140. Because nut 190 is self locking, it will retain platform 140 in the established position. Now, the stroke of piston 130 with respect to chamber 126 is calibrated with the lowermost indication 194 on shaft 162.

The calibration marks 194 may be spaced relatively far apart depending upon how narrow the cross section of chamber 126 is made. In the preferred form of the apparatus illustrated in FIG. 2, it is apparent that the cross-section of chamber 126 is considerably smaller than that of chamber 44. Hence, the difference between the various calibration marks 194 can be greater with a lesser quantity of lubricant being indicated by each length along the cylinder 122.

As noted above, it is the purpose of the pump 10 to produce only a smaller quantity of lubricant at the outlet conduits 156, 158. When the system has to be primed or when new lines leading to new bearings or fittings are added to the system, because only a small quantity of lubricant is pumped into these lines from the second pump 120, the entire system and/or the new lines therein may not be supplied with oil and may not themselves dispense oil for many pump cycles until all of the lines are filled. In order to fill the outlet conduits 156, 158, and all lines leading from conduits 158 with oil prior to operation of pump 10, inlet check valve 200 communicates with the conduits 156, 158. A continuous flow of lubricant may be supplied to the inlet check valve 200 by a pump (not shown) which pumps the lines 156, 158 and any lines and fittings communicating with line 158 full of oil. One way check valve 154 prevents any back flow due to the pump at inlet check valve 200.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. A cyclic pump for incompressible fluids, comprising:
   a first piston pump, comprising: a first cylinder, a first piston having an end in said first cylinder and movable through said first cylinder and defining in said first cylinder beyond said end of said first piston a first pump chamber; a first inlet to and a first outlet from said first pump chamber;
   a second piston pump, comprising: a second cylinder, a second piston having an end in said second cylinder and movable through said second cylinder and defining in said second cylinder beyond said end of said second piston a second pump chamber; a second inlet to and a second outlet from said second pump chamber; a conduit directly connected between said first outlet and said second inlet, whereby said first pump chamber pumps to and fills said second pump chamber under pressure;
   cam means for operating said first and said second piston pumps;
   first cam follower means on said first piston pump and positioned to be moved by movement of said cam means; said first cam follower means being so positioned on and so connected with said first piston pump as to cause a predetermined change in volume of said first pump chamber when said first cam follower means is moved by said cam means in one direction;
   second cam follower means on said second piston pump and positioned to be moved by movement of said cam means in said one direction; said second cam follower means being so positioned on and so connected with said second piston pump as to cause a change in volume of said second pump chamber of the type opposite to said predetermined change in volume, which said second cam follower is moved by movement of said cam means in said one direction.

2. The cyclic pump of claim 1, further comprising a flow control fitting having an inlet connected into said conduit between said first outlet and said second inlet for diverting away from said second inlet a portion of the output from said first chamber through said first outlet; the relative sizes of said first and said second pump chambers and the distances traveled by said first and said second cam followers being related such that in each cycle of said first and said second pumps, said first pump is capable of pumping more fluid than said second pump.

3. The cyclic pump of claim 1, further comprising biasing means connected with said first pump to act in opposition to the motion caused by movement of said cam means by said first cam follower means.

4. The cyclic pump of claim 3, wherein said predetermined change in volume consists of enlargement of said first piston pump chamber and said change in volume opposite to said predetermined change in volume consists of reduction of said second piston pump chamber.

5. The cyclic pump of claim 4, wherein said first cam follower means is connected to said first piston such that it moves said first piston;
   said biasing means also being connected to said first piston.

6. The cyclic pump of claim 5, further comprising:
   means holding said second piston stationary with respect to movement of said second cylinder relative to said second piston; said second cam follower means being connected to said second cylinder so as to move said second cylinder to reduce said second pump chamber upon movement by said cam means of said second cam follower means in said one direction.

7. The cyclic pump of claim 1, wherein said predetermined change in volume consists of enlargement of said first piston pump chamber and said change in volume opposite to said predetermined change in volume consists of reduction of said second piston pump chamber;
   means holding said second piston stationary with respect to movement of said second cylinder relative to said second piston; said second cam follower means being connected to said second cylinder so as to move said second cylinder to reduce said second pump chamber upon movement by said cam means of said second cam follower means.

8. The cyclic pump of claim 7, wherein said first cam follower means is connected to said first piston such that it moves said first piston;
   said biasing means also being connected to said first piston.

9. The cyclic pump of claim 7, wherein said second cam follower means comprises a platform attached to said second cylinder; said cam means is connected to engage and move said platform a distance in said one direction, which said one direction reduces the volume of said second pump chamber and pumps fluid therefrom out said second outlet.

10. The cyclic pump of claim 9, and adjusting means for adjusting the distance in said one direction over which said platform is moved;
   said adjusting means comprising: a shaft having a platform support element attached thereto; said platform support element being adjustable to different positions along said shaft; said platform support element engaging said platform on the same side thereof that said platform is engaged by said cam means, and adjustment of said platform support element along said shaft adjusts the extent to which said platform is shiftable by said cam means;

shaft support means for supporting said shaft relatively stationary such that movement of said platform support element is with respect to a relatively stationary shaft.

11. The cyclic pump of claim 10, wherein said shaft support means comprises a fixed plate through which said shaft passes and comprises a sleeve through which said shaft passes; said sleeve passing through said plate; means for affixing said sleeve on said plate;

cooperating means in said sleeve and on the periphery of said shaft for enabling adjustment of the position of said shaft along said sleeve;

indicator elements on said shaft for indicating the extent to which said shaft is shifted with respect to said sleeve.

12. The cyclic pump of claim 9, wherein said cam means is in direct engaging contact with one of said first and second cam followers and the other of said first and second cam followers is in direct engaging contact with the one said cam follower in engagement with said cam.

13. The cyclic pump of claim 12, wherein said cam means comprises a pin that is movable into engagement with the one said cam follower, and that is positioned so as to engage one surface of that said cam follower and means for moving said cam means pin in a manner to cause the recited movement of said cam followers in said one direction.

14. The cyclic pump of claim 13, further comprising a support for said cam means pin; said cam means pin support comprising a rotatable shaft and said cam means pin being eccentric to its said shaft; said cam means pin support shaft and said cam means pin being so located and the one said cam follower being so shaped that upon rotation of said cam means support, said cam means pin being rotated into engagement with the one said cam follower during part of the rotation of said cam means pin support and said cam means pin being rotated out of engagement with the one said cam follower during the remainder of the rotation of said cam means pin support;

motor means connected with said cam means pin support for rotating it.

15. A cyclic pump for incompressible fluids, comprising:

a fixed support;

a first cylinder attached to said fixed support; a first piston movable through said first cylinder;

a first piston pump, comprising: a first cylinder, a first piston having an end in said first cylinder and movable through said first cylinder and defining in said first cylinder beyond said end of said first piston a first pump chamber; a first inlet to and a first outlet from said first pump chamber;

a second piston pump comprising: a second cylinder, a second piston having an end in said second cylinder; said second piston being attached to said support; said second cylinder being movable with respect to said second piston such that the second piston moves through said second cylinder and said second piston defining in said second cylinder beyond said end of said second piston a second pump chamber; a second inlet to and a second outlet from said second pump chamber; a conduit directly connected between said first outlet and said second inlet whereby said first pump chamber pumps to and fills said second pump chamber under pressure;

a first cam follower attached to said first piston such that movement of said first cam follower in one direction moves said first piston in one direction and wherein said one direction of movement of said first piston is the direction of movement thereof out of said first cylinder, thereby enlarging the volume of said first pump chamber for drawing fluid therein;

a second cam follower attached to said second cylinder, such that movement of said second cam follower in a second direction moves said second cylinder in said second direction which is the direction moving said second piston into said second cylinder, and movement of said second cylinder in said second direction moves said second cylinder with respect to said second piston to reduce the volume of said second pump chamber and pump fluid therefrom through said second outlet;

a cam carried by said support; cam moving means connected with said cam for moving said cam into engagement with said first cam follower and for continuing to move said cam once it is in engagement with said first cam follower to move said first cam follower in said one direction; said cam moving also moving said cam into position to move said second cam follower and after causing such movement of said cam continuing to move said second cam follower in said second direction; said cam, said first cam follower and said second cam follower being so shaped, positioned and connected such that said first cam follower motion in said one direction and said second cam follower motion in said second direction occurs simultaneously;

biasing means connected with said first piston for acting in opposition to the motion caused by said first cam follower in said one direction, thereby to cause said first piston to move in a direction opposite said one direction, thereby to pump fluid from said first pump chamber;

a flow control fitting having an inlet connected into said conduit between said first outlet and said second inlet and having a flow restriction therein, said flow control fitting being for diverting away from said second inlet a portion of the output through said first outlet; the relative sizes of said first and said second pump chambers and the distances traveled by said first and said second cam followers being related such that in each cycle of said first and said second pumps, said first pump is capable of pumping more fluid than said second pump.

16. The cyclic pump of claim 15, wherein said second cam follower comprises a platform attached to said second cylinder and said cam being movable to have its force applied to one side of said platform so as to move said platform in said second direction;

adjusting means for adjusting the distance in said second direction over which said platform is moved; said adjusting means comprising: a shaft; a platform support element attached to said shaft; said platform support element being adjustable to different positions along said shaft; said platform support element engaging said platform on the same side thereof that said platform has force applied to it by said cam; and adjustment of said platform support element along said shaft adjusts the extent to which said platform is shiftable by said cam; means supporting said shaft relatively stationary on said pump support.

17. The cyclic pump of claim 16, wherein said support comprises a fixed plate through which said shaft passes; a sleeve through which said shaft passes, said sleeve passing through said plate; means for affixing said sleeve on said plate;

cooperating means in said sleeve and on the periphery of said shaft for enabling adjustment of the position of said shaft along said sleeve;

indicator elements on said shaft for indicating the extent to which said shaft is shifted with respect to said sleeve.

18. The cyclic pump of claim 16, wherein said cam is in direct engaging contact with one of said first and second cam followers and the other of said first and second cam followers is in direct engaging contact with the one said cam follower in engagement with said cam.

19. The cyclic pump of claim 16, further comprising respective one-way check valves in said first and second inlets for permitting flow only into the respective pump chambers; one-way check valves in said first and second outlets for permitting flow only out of the respective pump chambers.

* * * * *